US008132724B2

(12) United States Patent
Hayashi

(10) Patent No.: US 8,132,724 B2
(45) Date of Patent: Mar. 13, 2012

(54) VEHICLE UNIT, VEHICLE SYSTEM AND PROGRAM FOR SAME

(75) Inventor: Kenta Hayashi, Obu (JP)

(73) Assignee: Denso Corporation, Kariya (JP)

( * ) Notice: Subject to any disclaimer, the term of this patent is extended or adjusted under 35 U.S.C. 154(b) by 422 days.

(21) Appl. No.: 12/381,487

(22) Filed: Mar. 12, 2009

(65) Prior Publication Data

US 2010/0089999 A1 Apr. 15, 2010

(30) Foreign Application Priority Data

Mar. 14, 2008 (JP) ................................ 2008-066135

(51) Int. Cl.
*G06K 5/00* (2006.01)

(52) U.S. Cl. ...................................................... 235/382

(58) Field of Classification Search .................. 235/382, 235/384, 492; 340/928; 705/13
See application file for complete search history.

(56) References Cited

U.S. PATENT DOCUMENTS

| | | | | |
|---|---|---|---|---|
| 6,088,680 | A * | 7/2000 | Hoshino et al. | 705/13 |
| 6,344,804 | B1 * | 2/2002 | Koga | 340/928 |
| 6,396,418 | B2 * | 5/2002 | Naito | 340/928 |
| 2008/0056495 | A1 | 3/2008 | Eguchi et al. | |

FOREIGN PATENT DOCUMENTS

| | | |
|---|---|---|
| JP | 2000-311262 | 11/2000 |
| JP | 2001-52218 | 2/2001 |
| JP | 2007-255128 | 2/2001 |
| JP | 2002-042192 | 2/2002 |
| JP | 2003-030702 | 1/2003 |
| JP | 2006-260432 | 9/2006 |
| JP | 2008-58021 | 3/2008 |
| JP | 2008-092539 | 4/2008 |
| JP | 2008-310801 | 12/2008 |

OTHER PUBLICATIONS

Office Action dated Mar. 2, 2010 in Japanese Application No. 2008-066135.

* cited by examiner

*Primary Examiner* — Seung Lee
(74) *Attorney, Agent, or Firm* — Harness, Dickey & Pierce, PLC

(57) ABSTRACT

A portable terminal receives a settlement record information instruction from a user for reading settlement record information, and requests a vehicle unit for an output of corresponding information represented by the user instruction. The vehicle unit then reads the corresponding settlement record information from among all information readable by the portable terminal, and transmits the information to the portable terminal. The settlement record information becomes therefore more accessible for the user without compromising privacy.

20 Claims, 9 Drawing Sheets

| CARD ID | REG. DATE | CODE | REGISTRATION TERMINAL |
|---|---|---|---|
| A | XXXX | XXXX | TERMINAL A |
| B | XXXX | XXXX | TERMINAL B |
| C | XXXX | XXXX | TERMINAL B |

| ACTIVATION TERMINAL | CODE | ACTIVATABLE CARD ID | TERMINAL USED FOR REG |
|---|---|---|---|
| TERMINAL C | XXXX | A | TERMINAL A |
| TERMINAL D | XXXX | A | TERMINAL A |

FIG. 6

| CARD ID | AMT | PRODUCT INFO | PLACE | BILLING DATE | ACTIVATION TERMINAL |
|---|---|---|---|---|---|
| B | XXXX | EXP-WAY A (×× TO △△) | EXP-WAY A (△△) | XXXX | TERMINAL B |
| A | XXXX | PRODUCT B | FASTFOOD B ADD:XXXXX | XXXX | TERMINAL A |
| C | XXXX | EXP-WAY B (▽▽ TO ○○) | EXP-WAY B (○○) | XXXX | TERMINAL B |
| A | XXXX | EXP-WAY D (×× TO ○○) | EXP-WAY D (○○) | XXXX | TERMINAL C |
| A | XXXX | PRODUCT A | FASTFOOD A ○○STORE | XXXX | TERMINAL D |
| A | XXXX | EXP-WAY C (□□ TO ▽▽) | EXP-WAY C (▽▽) | XXXX | TERMINAL A |
| ... | ... | ... | ... | ... | ... |

VEHICLE UNIT, VEHICLE SYSTEM AND PROGRAM FOR SAME

CROSS REFERENCE TO RELATED APPLICATION

The present application is based on and claims the benefit of priority of Japanese Patent Application No. 2008-66135, filed on Mar. 14, 2008, the disclosure of which is incorporated herein by reference.

FIELD OF THE INVENTION

The present disclosure generally relates to a vehicle unit that settles a toll fee of an expressway through wireless communication.

BACKGROUND INFORMATION

Conventionally, the ETC system for paying a toll fee of, for example, an expressway without stopping at a toll gate has been developed and implemented to a practical use. The ETC system uses a vehicle unit that is disposed on a vehicle and a road-side unit disposed around the toll gate of the expressway, together with other units, for reading a card ID from an IC card inserted in the vehicle unit and for transmitting the card ID to the road-side unit.

However, the settlement of the toll fee by using the ETC system cannot be performed if the IC card is properly inserted in the vehicle unit, that is, if the card ID cannot be read from the IC card. When, for example, the card user forgets to insert the IC card in the vehicle unit, the settlement failure occurs at the toll gate. Further, if the contact point of the vehicle unit is not working properly, the card ID cannot be properly read from the IC card due to the connection failure between the IC card and the vehicle unit. In those cases, the vehicle having the vehicle unit cannot pass the toll gate without stopping.

The present application has three previously filed applications that include at least one of the inventors in common. That is, a previous application No. 1 (Japanese patent application No. 2006-313377, also available as a publication of US patent application 20080056495) discloses a technique that stores a card ID generated in a server of a card company in the vehicle unit, and receives the card ID through a portable terminal and stored the ID therein. Then, the vehicle unit uses the stored card ID for processing data for the settlement of the toll fee. By using the processing scheme described above, there is no need to insert the IC card into the vehicle unit at the time of settlement of the toll fee, thereby providing a solution to the above problem.

Further, though the vehicle unit used in the previous application No. 1 may be prone to a problem that allows an illegal use of the card ID stored in the vehicle unit, a previous application No. 2 (Japanese patent application No. 2007-126934) discloses a solution for the above problem. That is, in the previous application No. 2, the vehicle unit sets the card ID stored in the vehicle unit to an inactivated condition when the vehicle starts its travel. Then, the card ID is set to an activated condition, according to an instruction from an activation terminal that is owned by a card ID holder or the like. That is, the card ID can be used for the settlement when put in the activated condition. In such an operation scheme, the card ID stored in the vehicle unit can be prevented from a use under a malicious intent.

Furthermore, a previous application No. 3 (Japanese patent application No. 2007-255128) discloses a technique that improves a user's convenience when he/she uses the vehicle unit disclosed in the previous application No. 2. More practically, the vehicle unit in the previous application No. 3 enables, for example, all of family members to use a single card ID stored in the vehicle unit in a sharing manner, by using an individual activation terminal associated to each of the family members.

In the above processing scheme, when the data processing for settling the toll fee in the vehicle unit generates settlement record information, the generated settlement record information is stored in the body of the vehicle unit. In such a vehicle unit, the settlement record information stored in the vehicle unit may be read through the activation terminal.

However, if the settlement record information stored in the vehicle unit is allowed to be output from the activation terminal without any restriction in the technique disclosed in the previous application No. 3, the holder of the activation terminal can obtain the settlement record information generated in association with other settlement that is performed by an owner of other activation terminal. The settlement record information is information that should not be disclosed/published to others without any restriction. That is, there should be some privacy protection measure implemented for protecting a privacy of the owner of the other activation terminal. Further, the owner of the activation terminal may possibly obtain unnecessary data processing record while obtaining his/her own settlement record, thereby leading to deterioration of the usability of the vehicle unit.

SUMMARY OF THE INVENTION

In view of the above and other problems, the present disclosure provides a vehicle unit that has an improvement of functions of the vehicle unit such as confirmation operation of settlement record information or the like, without degrading a privacy protection for a user of the vehicle unit.

In an aspect of the present disclosure, the vehicle unit for use in a toll process that processes data for settling toll by using a card ID in communication with a roadside unit includes: a receiver for receiving from an activation terminal an activation instruction that activates the card ID by setting the card ID to an activated condition; a controller for setting the card ID to the activated condition in correspondence to the activation instruction received by the receiver for specifying a specific card ID after performing a setting of one of the activated condition and an in-activated condition that makes the card ID unavailable; a storage for storing information on toll settlement; and an output unit for outputting various information. When the controller receives an output instruction for outputting a predetermined information from information regarding toll settlement process stored in the storage from the activation terminal through the receiver, the controller performs a determination process that determines whether an output of the predetermined information to an external destination by using the activation terminal that has originated the output instruction received by the receiver is allowed or not, and the controller outputs, as an output process, the predetermined information to the external destination through the output unit if it is determined in the determination process that the output of the predetermined information to the external destination is allowed.

The vehicle unit, in this case, may perform the toll process for settlement of the toll fee by using any one of multiple (one, two or more) card IDs stored in the body of the vehicle unit, and, the card ID may be retrieved from an IC card that is connected to the vehicle unit for the settlement of the toll fee. Further, two or more activation terminal may be allowed in the above-described operation scheme for one card ID.

The information output from the vehicle unit through the activation terminal, thus, can be restricted. Therefore, the privacy protection for the user of the vehicle unit can be provided by restricting the output of the information regarding the owner of the other activation terminal when a certain activation terminal is used to output the information in the vehicle unit. Further, restriction on the output of useless/unnecessary information for the owner of the activation terminal can also be enabled, thereby achieving an improvement of the usability of the vehicle unit.

Further, the vehicle unit having the above-described feature may be considered as a component of a vehicle system, and the entire vehicle system having the vehicle unit and the activation terminal may be claimed as a scope of the present disclosure.

That is, the user can strictly restrict the output of the information that is stored in the vehicle unit by using the combination of the above-described vehicle unit and the activation terminal. Therefore, the privacy of the user of the vehicle unit can be strictly maintained, together with an improvement of the usability of the vehicle unit and the activation terminal.

Further, the above-described vehicle unit may be implemented by using a program product that controls a computer to be serving as the control unit of the vehicle unit in.

That is, the program product may be stored in a storage medium such as a magneto-optical disk, a CD-ROM, a hard disk drive, a ROM, a RAM, or any computer-readable storage medium, for causing a computer to be serving as the vehicle unit having the advantageous feature of the present disclosure.

BRIEF DESCRIPTION OF THE DRAWINGS

Objects, features, and advantages of the present disclosure will become more apparent from the following detailed description made with reference to the accompanying drawings, in which:

FIG. 6 is a diagram of settlement record information in the embodiment of the present disclosure;

DETAILED DESCRIPTION

Figure 1:
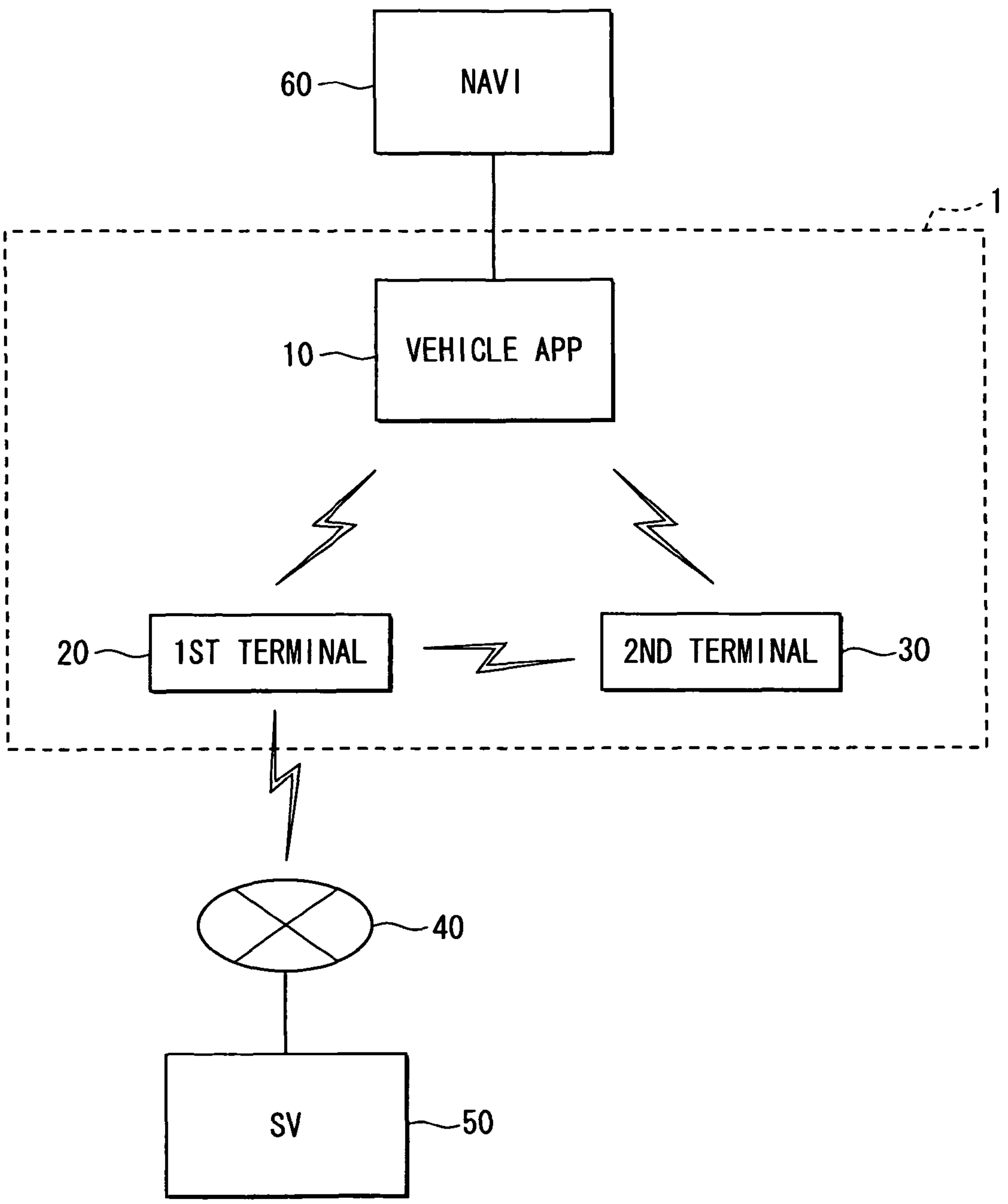
FIG. 1 is a block diagram of a vehicle system in an embodiment of the present disclosure.

Hereafter, the drawing is used to describe the embodiment of the present disclosure. The embodiment of the present invention is not limited to the one described in the following in any way, and various changes and/or modifications may make the scope of the present disclosure more accessible and comprehensible as long as those diversity pertains to the spirit of the original idea.

(Explanation of Structural Composition)

(1) The Entire Structure

FIG. 1 is a block diagram where the structural composition of an in-vehicle system 1 is shown. The in-vehicle system 1 is composed of a vehicle unit 10 (designated as VEHICLE APP[ARATUS] in the drawing) plus a first portable terminal 20 and a second portable terminal 30. In FIG. 1, the in-vehicle system 1 includes only one unit of the first portable terminal 20 and only one unit of the second portable terminal 30. However, two or more terminals 20 and 30 may also be included. Further, the in-vehicle system 1 may include only one unit of the first portable terminal 20, or multiple units of the first portable terminals 20 exclusively, without including the second portable terminal 30. Furthermore, the first portable terminal 20 and the second portable terminal 30 may, for example, be a cellular phone, a portable information terminal, or a portable device such as a key-less entry system, a smart entry system or the like.

Moreover, the vehicle unit 10 is connected with a navigation apparatus 60 installed in the vehicle through a vehicle LAN in the vehicle. The navigation apparatus 60 has a toll fee identification function to identify a regular toll fee for a certain section of a tollway, an expressway, or the like, that is, in other words, a toll fee that does not have a discount applied thereto.

Moreover, the first portable terminal 20 can connect to a wireless public network 40 through wireless communication (for instance, communication such as CDMA or the like), and can communication with a card center server 50 that is disposed in a card company or the like through the wireless public network 40.

(2) Composition of the Vehicle Unit

Figure 2:
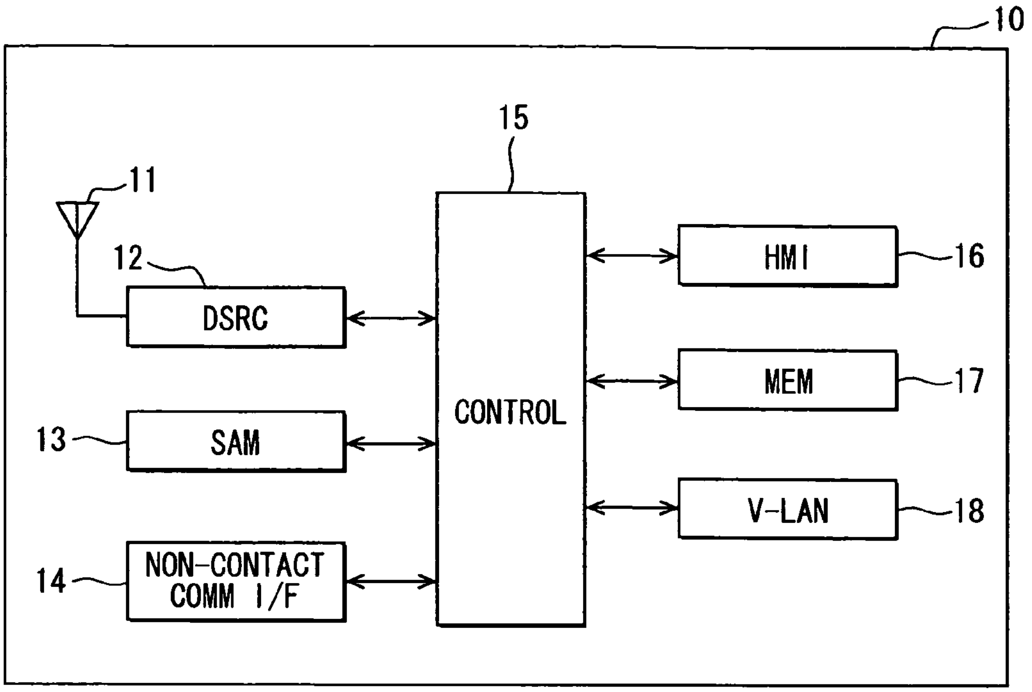
FIG. 2 is a block diagram of a vehicle unit in the embodiment of the present disclosure.

Next, details of the vehicle unit 10 are described with reference to a block diagram shown in FIG. 2. The vehicle unit 10 is a device that communicates with a road-side device (not shown in the drawing) disposed in, for example, a toll gate of the ETC system, a parking place, a fast-food restaurant or the like, and performs data processing regarding a toll payment/settlement by using a pre-registered card ID for use in the vehicle unit (i.e., designated as a vehicle-use card ID hereinafter). The processing of card ID registration to the vehicle unit 10 and the processing of the toll settlement are described later in detail together with other processing. The vehicle unit 10 may have at least one card ID to be registered thereto. Further, the vehicle unit 10 generates settlement record information when it performs the toll payment processing.

The vehicle unit 10 has a radio antenna 11, a dedicated short range communication (DSRC) unit 12, a SAM 13, a non-contact communication interface (I/F) 14, a control unit 15, a human machine interface (HMI) 16, a storage unit 17, and an in-vehicle LAN communication unit 18.

The radio antenna 11 is an antenna that is used for DSRC communication. The DSRC unit 12 is a unit to send and receive information by using the radio antenna 11 to and from the road-side device through the DSRC communication.

The SAM 13 is a device that encrypts and decrypts information in the communication with the road-side device.

The non-contact communication I/F 14 is an interface by using a short range, non-contact wireless communication such as, for example, communication by ISO14443 TYPE B, Bluetooth (registered trademark) or the like, performed to establish communication with the first portable terminal 20 and the second portable terminal 30. The communication through the I/F 14 may be established with not only to the first portable terminal 20 and the second portable terminal 30, but also to a non-contact type IC card. Further, the interface may be a contact type.

The control unit 15 is a unit that is composed of a CPU, a ROM, a RAM, and an I/O, together with other components, and controls each unit of the vehicle unit 10 in a unified manner. The control unit 15 performs various processing on the basis of the program memorized in the ROM. Further, the control unit 15 has a clock function to specify the present date and time.

The HMI 16 is a unit that provides interface (Human Machine Interface) for communications between a man and a machine. More practically, the HMI 16 is composed of operation buttons, LED lamps; speakers and the like.

The storage unit 17 is composed of the storage device such as a flash memory or the like that does not requires memory-retention operation for storing various information. In the storage unit 17, at least one vehicle-use card ID for use in the vehicle unit required for the payment of the toll fee is stored. The vehicle-use card ID is in either of the two conditions, that is, in an activated condition and in an inactivated condition. The vehicle-use card ID is, at a time of the start of the travel of the vehicle, is in the inactivated condition. The vehicle unit 10 sends the vehicle-use card ID in the activated condition to the road-side device when it performs the data processing for toll fee payment. Further, in the storage unit 17, a card ID table, an activation terminal table, and a settlement record information table are stored. Details of those tables are described later.

The in-vehicle LAN communication unit 18 is a device that is used to communicate with the apparatus such as the navigation apparatus 60 that is connected through the vehicle LAN.

(3) Composition of the First Portable Terminal

Figure 3:
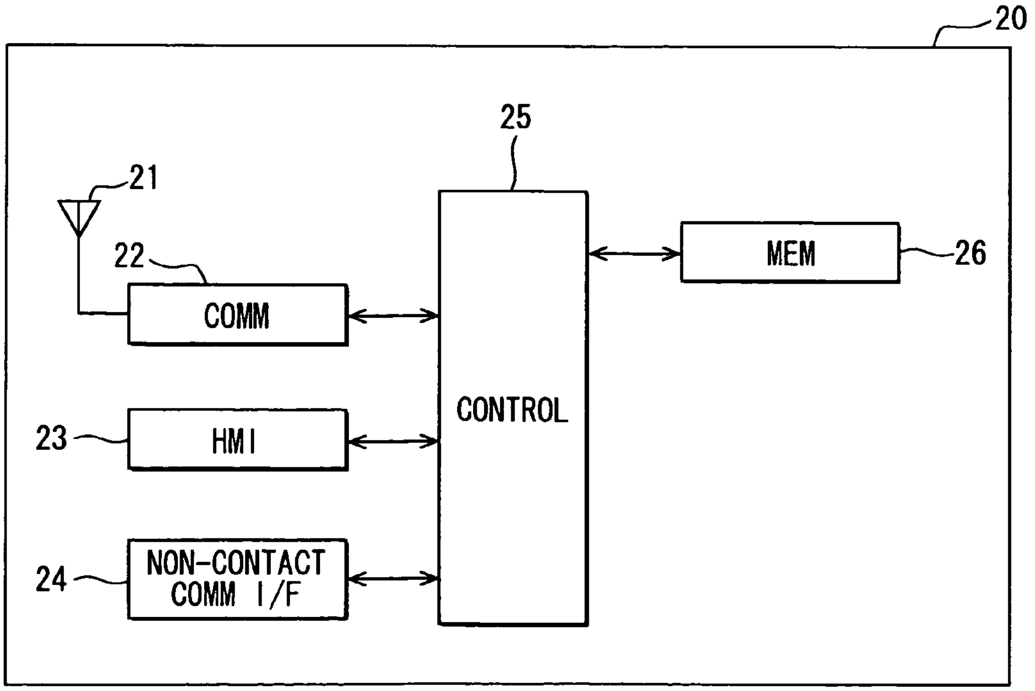
FIG. 3 is a block diagram of a first portable terminal in the embodiment of the present disclosure.

Next, a block diagram in FIG. 3 is used to describe the details of the first portable terminal 20 that is used in the in-vehicle system 1. The first portable terminal 20 is a terminal that is capable of registering the vehicle-use card ID to the vehicle unit 10 (described later in detail). Moreover, the first portable terminal 20 serves as an activation terminal that can set the vehicle-use card ID to the activated condition when the vehicle-use card ID has been registered by using the terminal 20. The first portable terminal 20 has a radio antenna 21, a public communication unit 22, an HMI 23, a non-contact communication I/F 24, a control unit 25, and a storage unit 26.

The radio antenna 21 is an antenna to wirelessly connect with the wireless public network 40.

The public communication unit 22 is a device to wirelessly perform wireless communication (for instance, communication such as CDMA), through the radio antenna 21 and the wireless public network 40, to send and receive information to and from the card center server 50 or the like.

The HMI 23 is a unit that provides interface (Human Machine Interface) for communications between a man and a machine. More practically, the HMI 16 is composed of operation buttons, LED lamps, speakers and the like.

The non-contact communication I/F 24 is an interface with the vehicle unit 10 by using a short distance non-contact wireless communication such as, for example, communication by ISO14443 TYPE B, Bluetooth (registered trademark) or the like. The communication through the I/F 24 may be established with not only to the vehicle unit 10 and the second portable terminal 30 but also to other device that is capable of having a non-contact type short range communication. Further, the interface may be a contact type.

The control unit 25 is a unit that is composed of a CPU, a ROM, a RAM, and an I/O, together with other components, and controls each unit of the vehicle unit 10 in a unified manner. The control unit 25 performs various processing on the basis of the program memorized in the ROM.

The storage unit 26 is composed of the storage device such as a flash memory or the like that does not requires memory-retention operation for storing various information. The storage unit 26 stores a terminal ID that is capable of specifying/identifying the first portable terminal 20.

(4) Composition of the Second Portable Terminal

Figures 4, 5A, 5B:
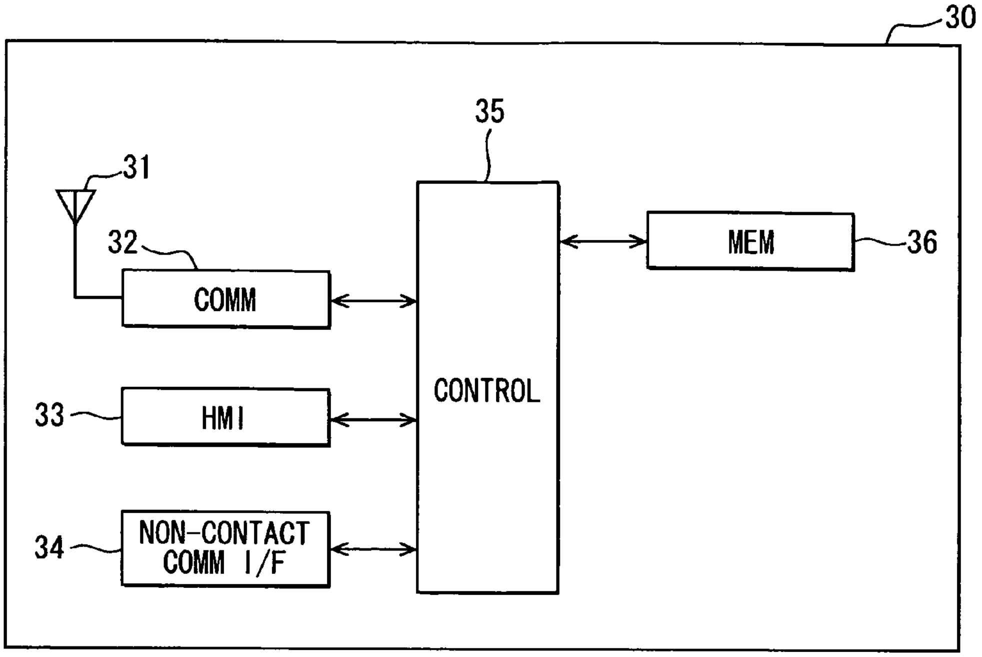
FIG. 4 is a block diagram of a second portable terminal in the embodiment of the present disclosure.
FIGS. 5A/5B are diagrams of a card ID for use in the vehicle unit, and a diagram of activation terminals in the embodiment of the present disclosure.

Next, a block diagram in FIG. 4 is used to describe the details of the second portable terminal 30 that is used in the in-vehicle system 1. The second portable terminal 30 is a terminal that can be registered, to the vehicle unit 10, as a portable terminal that is capable of activating the vehicle-use card ID stored in the vehicle unit 10. The second portable terminal 30 includes a radio antenna 31, a public communication unit 32, an HMI 33, a non-contact communication I/F 34, a control unit 35, and a storage unit 36.

The radio antenna 31 is an antenna to wirelessly connect with the wireless public network 40.

The public communication unit 32 is a device to wirelessly perform wireless communication (for instance, communication such as CDMA), through the radio antenna 31 and the wireless public network 40, to send and receive information.

The HMI 33 is a unit that provides interface (Human Machine Interface) for communications between a man and a machine. More practically, the HMI 16 is composed of operation buttons, LED lamps, speakers and the like.

The non-contact communication I/F 34 is an interface with the vehicle unit 10 by using a short distance non-contact wireless communication such as, for example, communication by ISO14443 TYPE B, Bluetooth (registered trademark) or the like. The communication through the I/F 34 may be established with not only to the vehicle unit 10 and the first portable terminal 20, but also to other device that is capable of having a non-contact type short range communication. Further, the interface may be a contact type.

The control unit 35 is a unit that is composed of a CPU, a ROM, a RAM, and an I/O, together with other components, and controls each unit of the vehicle unit 10 in a unified manner. The control unit 35 performs various processing on the basis of the program memorized in the ROM.

The storage unit 36 is composed of the storage device such as a flash memory or the like that does not requires memory-retention operation for storing various information. The storage unit 36 stores a terminal ID that is capable of specifying/identifying the second portable terminal 30.

(5) The Card Central Server

Next, the card center server 50 is described. The card center server 50 has a communication function for establishing communication with the first portable terminal 20 through the wireless public network 40, an ID generation function for generating a card ID based on information such as an ID or the like, together with other functions.

Next, the operation of the in-vehicle system 1 is described. However, in the following description, contents of the toll settlement processing by using the vehicle-use card ID registered to the vehicle unit 10, which has already been disclosed in Japanese Patent Application No. 2006-313377 or the like, are left to the relevant disclosure, and the description is focused to the core of the present disclosure.

(1) Card ID Table

First, a card ID table memorized in the storage unit 17 of the vehicle unit 10 is described.

The table in FIG. 5A is the vehicle-use card ID table memorized in the storage unit 17 for use with the vehicle unit 10. The vehicle-use card ID table shows information of the vehicle-use card ID that is registered in the vehicle unit 10. The vehicle-use card ID table is updated when the vehicle-use card ID is registered to the vehicle unit 10.

The vehicle-use card ID table has information items of "card ID for the vehicle unit," "Registration date," "Personal code," and "Portable terminal used for registration."

"The vehicle-use card ID" is an item that shows the vehicle-use card ID registered in the vehicle unit 10.

"Registration date" is an item that indicates the date and time when the vehicle-use card ID is registered by using the first portable terminal 20.

"Personal code" is an item that shows a personal code generated by the first portable terminal 20 when the vehicle-use card ID is registered in the vehicle unit 10 by using the first portable terminal 20. The personal code shown in this item is also memorized in the first portable terminal 20, and the code is also used for the verification/authentication determination of the first portable terminal 20 that is used for the registration of the vehicle-use card ID.

"Portable terminal used for registration" is an item that shows portable terminal ID that identifies the first portable terminal 20 used when the vehicle-use card ID table is registered.

In FIG. 5A, the table shows that two records having (card ID) B and (card ID) C in the column "Card ID" have the same terminal B in the column "Portable terminal used for registration." This means that the vehicle-use card ID B and the vehicle-use card ID C are respectively registered by using the identical unit of the first portable terminal 20.

(2) Activation Terminal Table

Next, the activation terminal table memorized in the storage unit 17 of the vehicle unit 10 is described.

The table described in FIG. 5B represents a list of the activation terminals memorized in the storage unit 17. The activation terminal table is, more practically, an information table that lists the second portable terminals registered as the activation terminal in the vehicle unit 10. The activation terminal table is updated when the second portable terminal 30 is registered to the vehicle unit 10 as the activation terminal.

The activation terminal table has the items of "Activation terminal," "Personal code," "Activatable card ID," and "Portable terminal used for registration."

"Activation terminal" is an item that shows a portable terminal ID that identifies the second portable terminal 30 registered as an activation terminal.

"Personal code" is an item that shows the personal code generated when the second portable terminal 30 is registered in the vehicle unit 10 as the activation terminal. The second portable terminal 30 registered as a terminal that is memorized as "Activatable" also has the item "Personal code," and the code is also used for the verification/authentication determination of the second portable terminal 30 that is registered as the activation terminal.

"Activatable card ID" is an item that shows the vehicle-use card ID that can be set to the activation condition by using the second portable terminal 30 that is listed as the "Activation terminal."

"Portable terminal used for registration" is an item that shows portable terminal ID that identifies the first portable terminal 20 used to register, in the vehicle unit 10, the second portable terminal 30 as a terminal that can activated. The processing for registering, as a terminal that can activated, the second portable terminal 30 is described later.

(3) Settlement Record Information Table

Next, the settlement record information table memorized in the storage unit 17 of the vehicle unit 10 is described. The table described in FIG. 6 is, more specifically, an information table that lists the settlement record memorized in the storage unit 17. The settlement record information table stores information records including settlement record information generated at a time of performing the toll fee settlement processing and information that shows a terminal that has set the vehicle-use card ID used for this settlement processing to the activated condition. The settlement record information table has items of "Card ID," "Money amount," "Product information," "Place," "Billing date," and "Activation terminal." In this case, from among the records in the settlement record information table, information indicated by "Card ID," "Money amount," "Product information," "Place," and "Billing date" corresponds to the settlement record information.

"Card ID" is an item that shows the vehicle-use card ID used for the toll fee settlement processing. For example, the vehicle-use card ID such as (card) A, (card) B, and (card) C is shown in the settlement record information table in FIG. 6.

"Money amount" (designated as "AMT" in the drawing) is an item that shows the amount of money paid by the toll fee settlement processing.

"Product information" is an item that shows the product purchased by the toll fee settlement processing. In FIG. 6, the item "Product information" shows the name and the traveled section of the tollway if it is the settlement record information at the time of payment of the toll fee of the tollway.

"Place" is an item that shows the place where the toll fee settlement processing has taken place. For instance, as shown in FIG. 6, if the settlement record information is about the purchase of the product at the fast food shop, the "Place" item may show the fast food shop chain name and the specific branch name of the chain, or may show the address of the branch. If, as another example, if the settlement record information is about the payment of the toll fee after a travel of the tollway, the item "Place" may show the exit of the tollway or the like.

"Billing date" is an item that indicates the date when the toll fee settlement processing is performed.

"Activation terminal" is an item that shows a portable terminal ID that identifies a portable terminal that has set the vehicle-use card ID used for the toll fee settlement processing to the activated condition. In the settlement record information table shown in FIG. 6, the item "Activation terminal" shows either of the portable terminals A and B corresponding to the first portable terminal 20, or the portable terminals C and D corresponding to the second portable terminal 30.

(4) Vehicle-Use Card ID Registration Processing

Figure 7:
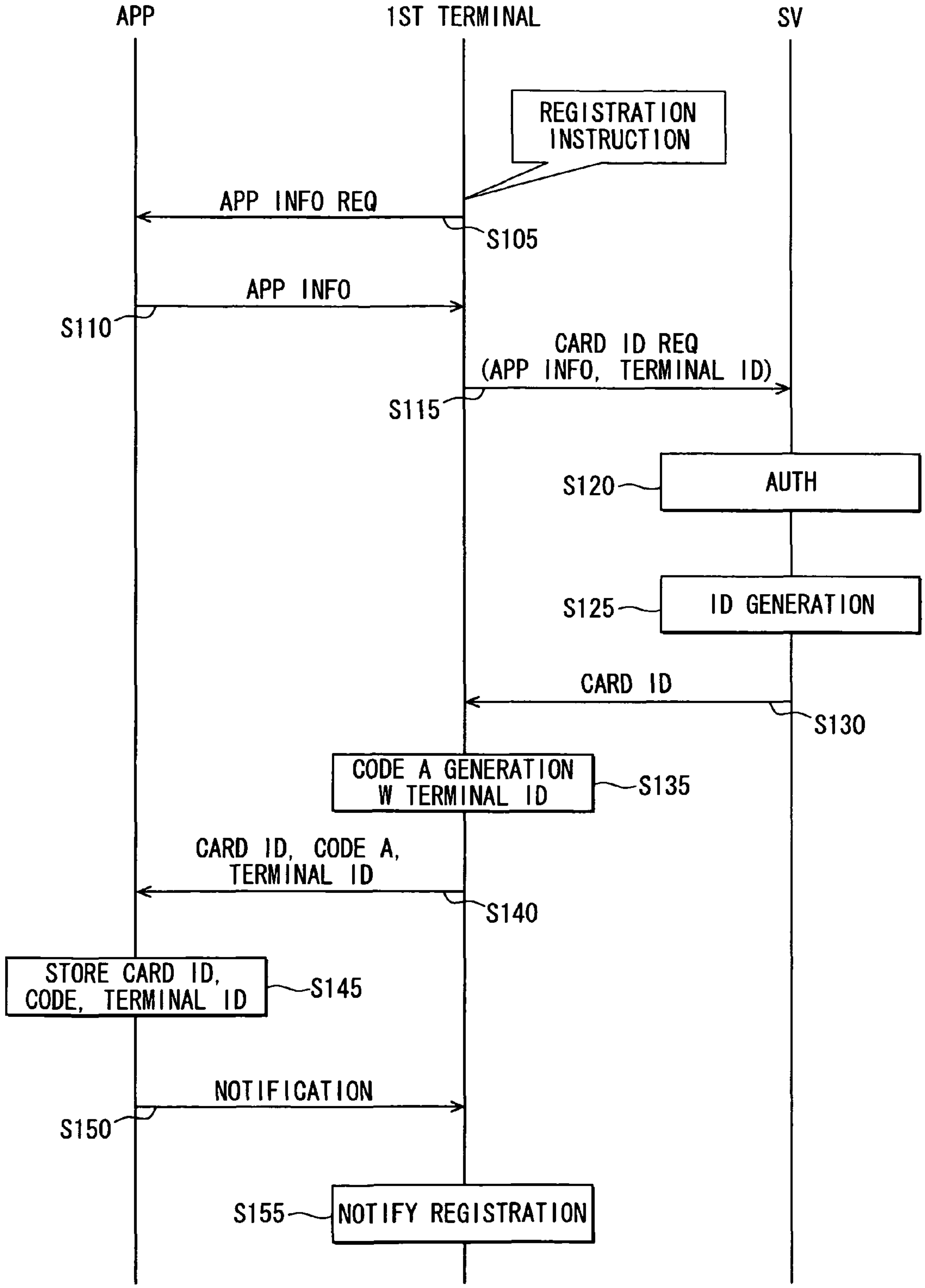
FIG. 7 is a sequence chart of processing that is performed for registering the card ID.

Next, the sequence chart shown in FIG. 7 is used for describing the processing that registers the vehicle-use card ID to the vehicle unit 10 (designated as APP[ARATUS] in FIG. 7) by using the first portable terminal 20. The first portable terminal 20 registers, to the vehicle unit 10, the vehicle-use card ID generated at the card center server 50 (designated as SV in FIG. 7) by using a portable terminal card ID memorized in the storage unit 26. The portable terminal card ID is a card ID used for the toll fee settlement processing performed by using the first portable terminal 20. That is, when the user holds the first portable terminal 20 over (i.e., close to) a special terminal in a retail shop, a convenience store, a restaurant, etc, the portable terminal card ID is read by the special terminal for performing the toll fee settlement processing. In the storage unit 26 of the first portable terminal

20, there may be only one portable terminal card ID, or there may be two or more portable terminal card IDs, and, on the basis of the portable terminal card ID selected by the user, registration of the vehicle-use card ID can be performed.

The control unit 25 of the first portable terminal 20 accepts an input for selecting a portable terminal card ID that is memorized in the storage unit 26 from the user through the HMI 23 (i.e., an operation button in practice). In addition, when the instruction of registering the vehicle-use card ID to the vehicle unit 10 on the basis of the selected portable terminal card ID is accepted, the control unit 25 requests the vehicle unit 10 for vehicle unit specific information (i.e., a management number, a form registration number, a vehicle number etc.: designated as APP[ARATUS] INFO in the drawing) through the non-contact communication I/F 24 (S105).

The control unit 15 of the vehicle unit 10 that has received the request transmits the vehicle unit specific information to the first portable terminal 20 through the non-contact communication I/F 14 (S110). The control unit 25 of the first portable terminal 20 that has received the vehicle unit specific information memorizes the received vehicle unit specific information in the storage unit 26, and further requests the card center server 50 for the vehicle-use card ID for use in the vehicle unit through the radio antenna 21 and the public communication unit 22 (S115). The information transmitted from the terminal 20 to the card center server 50 includes not only the request for the vehicle-use card ID for use in the vehicle unit, but also the vehicle unit specific information received from the vehicle unit 10 together with the portable terminal card ID selected by the user.

The card center server 50 that has received the request for the vehicle-use card ID and the like from the first portable terminal 20 determines whether the received portable terminal card ID is valid or authenticated (S120). More practically, the validity of the portable terminal card ID is examined by, for example, referring to the database which stores data concerning the portable terminal card ID. That is, whether the portable terminal card ID is issued in an authentic manner is examined. Then, the vehicle-use card ID is generated after determining the portable terminal card ID is valid (S125). The vehicle-use card ID is the information that is intended to be stored in the vehicle unit 10, and is the information used for the toll fee settlement processing performed by the vehicle unit 10.

After generating the vehicle-use card ID, the card center server 50 transmits the generated vehicle-use card ID to the first portable terminal 20 through the wireless public network 40 (S130).

The control unit 25 of the first portable terminal 20 that has received the vehicle-use card ID generates the personal code (designated as a "code A" hereinafter) on the basis of the portable terminal card ID (S135). Then, the portable terminal ID that identifies the first portable terminal 20 memorized in the storage unit 26 is, together with the received vehicle-use card ID and the generated code A, transmitted to the vehicle unit 10 through the non-contact communication I/F 14 (S140). In this case, generating the code on the basis of the portable terminal card ID indicates a coding (i.e., an encryption) of the portable terminal card ID by using a prescribed electronic key. The key is also owned by the vehicle unit 10. Then, the control unit 25 stores, in the storage unit 26, the generated code A in association with the received vehicle-use card ID and the portable terminal card ID corresponding to the vehicle-use card ID.

The control unit 15 of the vehicle unit 10 that has received the vehicle-use card ID, the code A, and the portable terminal ID updates the vehicle-use card ID table stored in the storage unit 17 for storing therein the vehicle-use card ID, the code A, and the portable terminal ID (S145). More practically, the control unit 15 generates a new record by setting the received vehicle-use card ID as the "Vehicle-use card ID," setting the current time identified by a clock function in the control unit 15 as the "Registration date," setting the received code A as the "Personal code," and setting the received portable terminal ID as the "Portable terminal used for registration" respectively. Then, the generated record is added to the vehicle-use card ID table. In this case, the vehicle-use card ID set in the inactivated condition that prohibits the use of the vehicle-use card ID. In the inactivated condition, the vehicle-use card ID memorized in the storage unit 17 cannot be read. That is, in other words, a lock function for prohibiting the read-out of the vehicle-use card ID is provided.

Subsequently, the control unit 15 transmits, to the first portable terminal 20 through the non-contact communication I/F 14, a notification that notifies completion of storage (Registration completion notification) (S150). The control unit 25 of the first portable terminal 20 that has received the registration completion notification displays, on the HMI 23 (e.g., on a liquid crystal display in practice), the completion of the registration of the vehicle-use card ID to the vehicle unit 10 (S155).

(5) Activation Terminal Registration Processing

Figure 8:
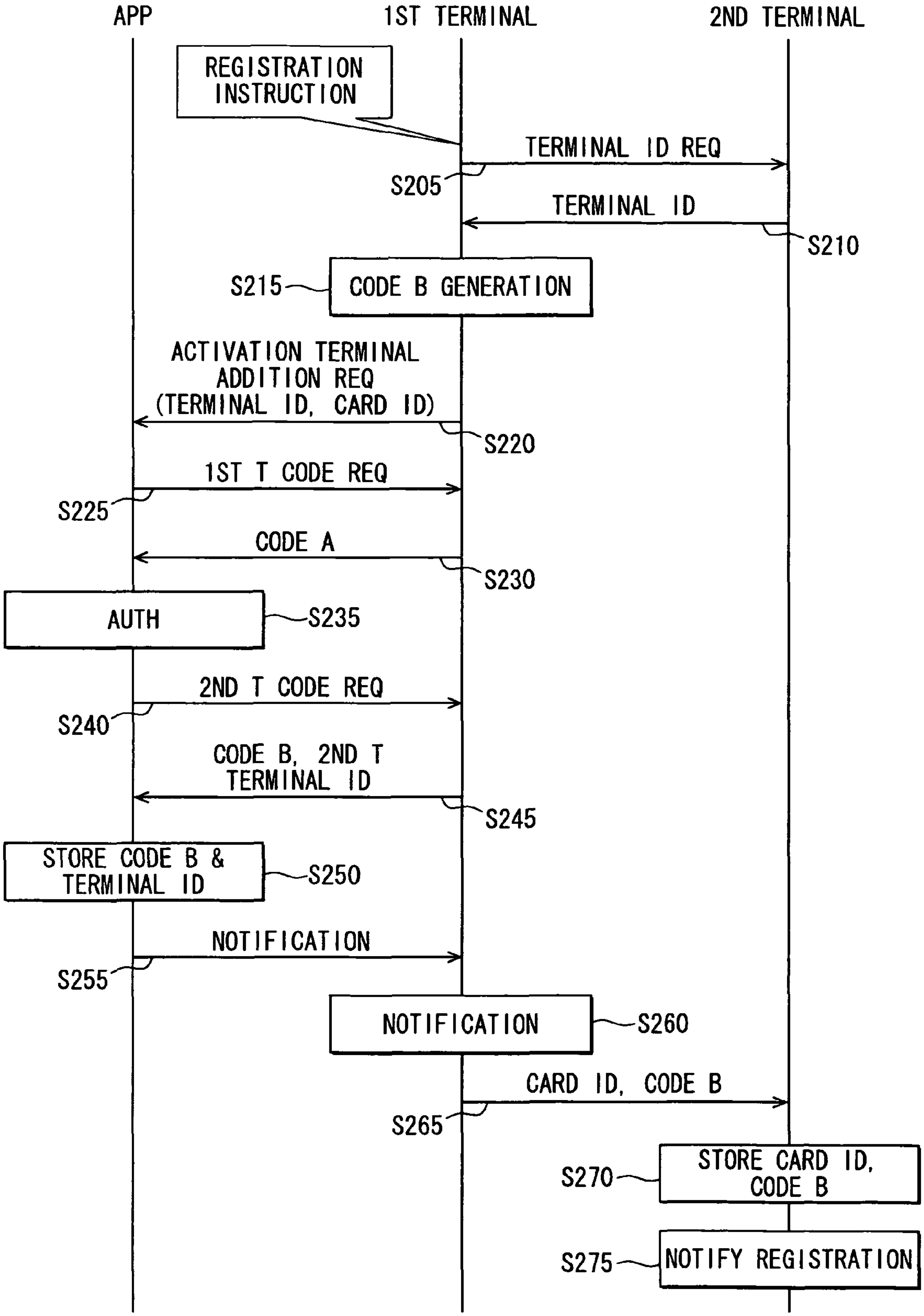
FIG. 8 is a sequence chart of processing that is performed for registering the activation terminal.

The sequence chart shown in FIG. 8 is used to describe the processing for registering, as a terminal that can be used to activate the vehicle-use card ID registered to the vehicle unit 10 (designated as APP), the second portable terminal 30. In the first portable terminal 20, or more specifically, in the storage unit 26 of the terminal 20, one or more vehicle-use card IDs that have been registered to the vehicle unit 10 is stored. The first portable terminal 20 registers the second portable terminal 30 to the vehicle unit 10 as a terminal that can be used for the activation of the vehicle-use card ID selected by the user from among the vehicle-use card IDs stored in the storage unit 26. In this case, the second portable terminal 30 may be registered as the activation terminal of respectively different multiple vehicle-use card IDs. That is, in other words, the second portable terminal 30 can be registered as an activation terminal that can activate two or more vehicle-use card IDs.

The control unit 25 of the first portable terminal 20 accepts a selection input of the vehicle-use card ID memorized in the storage unit 26 from the user through the HMI 23 (i.e., by using an operation button in practice). In addition, the control unit 25 requests the second portable terminal 30 for the portable terminal ID through the non-contact communication I/F 24, when an instruction is received by the control unit 25 for registering, regarding the selected vehicle-use card ID, the second portable terminal 30 as the activation terminal, to the vehicle unit 10 (S205).

The control unit 35 of the second portable terminal 30 that has received the request reads the portable terminal ID memorized in the storage unit 36, and transmits the ID to the first portable terminal 20 through the non-contact communication I/F 34 (S210).

The control unit 25 of the first portable terminal 20 that has received the portable terminal ID from the second portable terminal 30 generates the personal code (designated as a "code B" hereinafter) on the basis of the received portable terminal ID (S215).

Then, the control unit 25 of the first portable terminal 20 transmits a request, to the vehicle unit 10 through the non-contact communication I/F 24, for addition of the second portable terminal 30 as the activation terminal regarding the selected vehicle-use card ID (S220). At the same time of transmitting the above request, the control unit 25 transmits, to the vehicle unit 10, together with the portable terminal ID of the first portable terminal 20, the vehicle-use card ID, both of which serve as a target of activation.

Then, the control unit 15 of the vehicle unit 10 that has received the above request further requests for the code of the first portable terminal through the non-contact communication I/F 14, in order to determine whether the first portable terminal 20 is valid (S225).

Then, the control unit 25 of the first portable terminal 20 that has received the code request reads the personal code A stored in association with the vehicle-use card ID in the storage unit 26, and transmits the ID to the vehicle unit 10 through the non-contact communication I/F 24 (S230).

The control unit 15 of the vehicle unit 10 that has received the code A determines the validity of the first portable terminal 20 that is on the other end of the communication on the basis of the code A (S235). More practically, the item "Vehicle-use card ID" and the item "Portable terminal used for registration" are examined to find, from the vehicle-use card ID information table memorized in the storage unit 17, a matching record that has the vehicle-use card ID and the terminal used for registration respectively agreeing with the received information. Then, the identified record is further examined to determine whether the code in the identified record agrees with the received code for determining the validity. When determined that the first portable terminal 20 is valid (S240), the control unit 15 of the vehicle unit 10 requests the first portable terminal 20 for the personal code and the portable terminal ID of the second portable terminal 30 that is to be registered as the activation terminal through non-contact communication I/F 14.

The control unit 25 of the first portable terminal 20 that has received the request transmits, to the vehicle unit 10 through the non-contact communication I/F 24, the code B generated in S215 and the received portable terminal ID of the second portable terminal 30 (S245).

The control unit 15 of the vehicle unit 10 that has received the code B and the portable terminal ID stores the code B and the portable terminal ID in the storage unit 17 by updating the activation terminal table that is memorized in the storage unit 17 (S250). More practically, the control unit 15 generates a new record by setting, in the new record, the following received items, that is, by setting the portable terminal ID of the second portable terminal 30 as the item "Activation terminal," by setting the received code B as the item "Personal code," by setting the received vehicle-use card ID as the item "Vehicle-use card ID that can be activated (Activatable card ID)," and by setting the received portable terminal ID of the first portable terminal 20 as the item "Portable terminal used for registration." Then, the generated record is added to the vehicle-use card ID table.

Then, the control unit 15 of the vehicle unit 10 transmits the notification of the completion of storage (i.e., a registration completion notification) through the non-contact communication I/F 14 (S255). The control unit 25 of the first portable terminal 20 that has received the registration completion notification displays, on the HMI 23 (e.g., on a liquid crystal display), the completion of the registration of the second portable terminal 30 to the vehicle unit 10 as the activation terminal regarding the selected vehicle-use card ID (S260). Then, the control unit 25 stores, in the storage unit 26, the portable terminal ID of the second portable terminal 30 in association with the vehicle-use card ID that can be activated by the second portable terminal 30 (i.e., in association with the "Activatable card ID"). Then, the code B generated in S215 and the vehicle-use card ID that serves as a target of activation are transmitted to the second portable terminal 30 through the non-contact communication I/F 24 (S265).

Then, the control unit 35 of the second portable terminal 30 that has received the information stores the received code B and the vehicle-use card ID in an associated manner in the storage unit 36 (S270). Then, the control unit 35 of the second portable terminal 30 displays, on the HMI 33 (e.g., on a liquid crystal display in practice), the registration of the second portable terminal 30 to the vehicle unit 10 as the activation terminal (S275).

(6) Vehicle-Use Card ID Activation Processing

Figure 9:
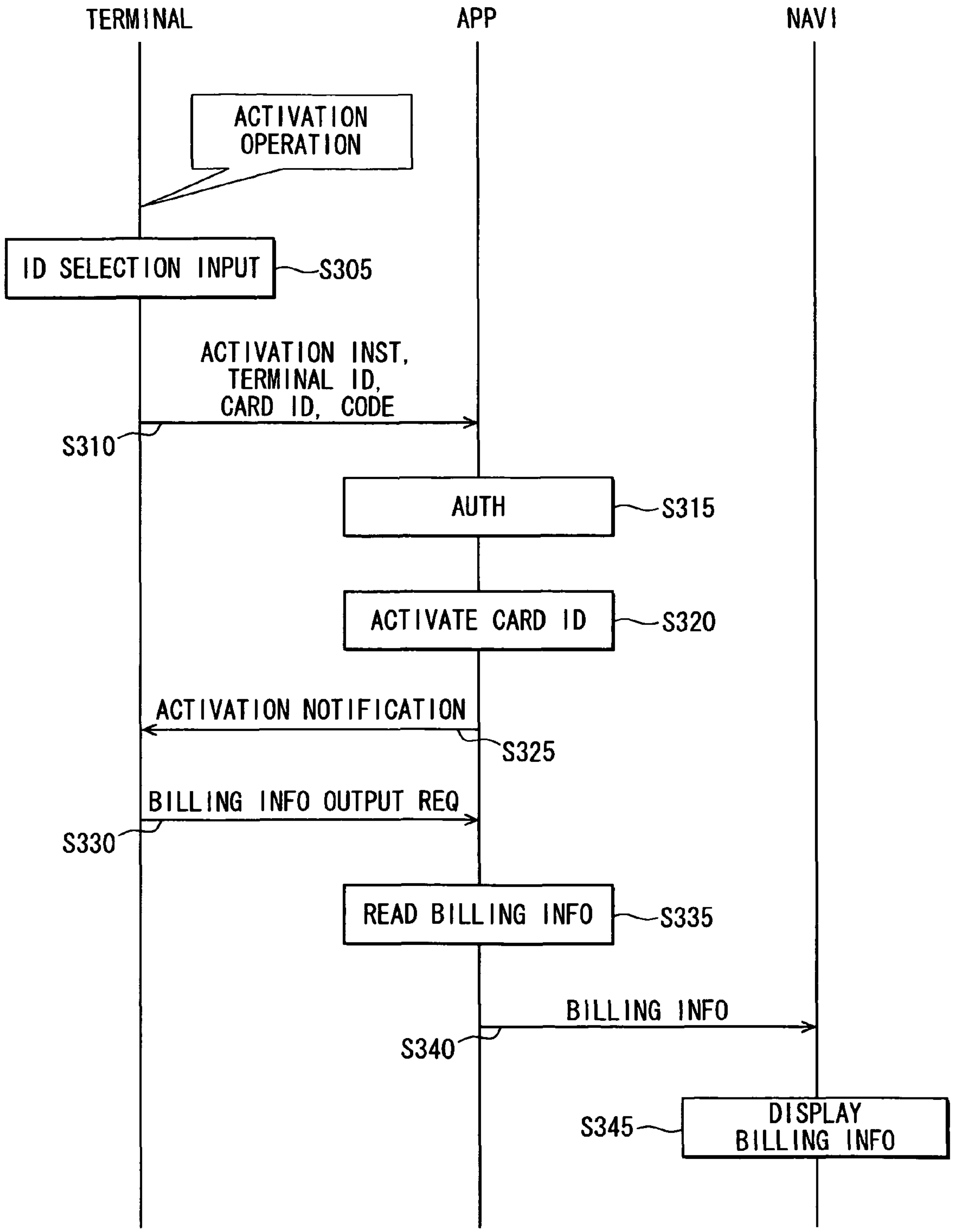
FIG. 9 is a is a sequence chart of processing that is performed for activating the card ID.
Figure 10:
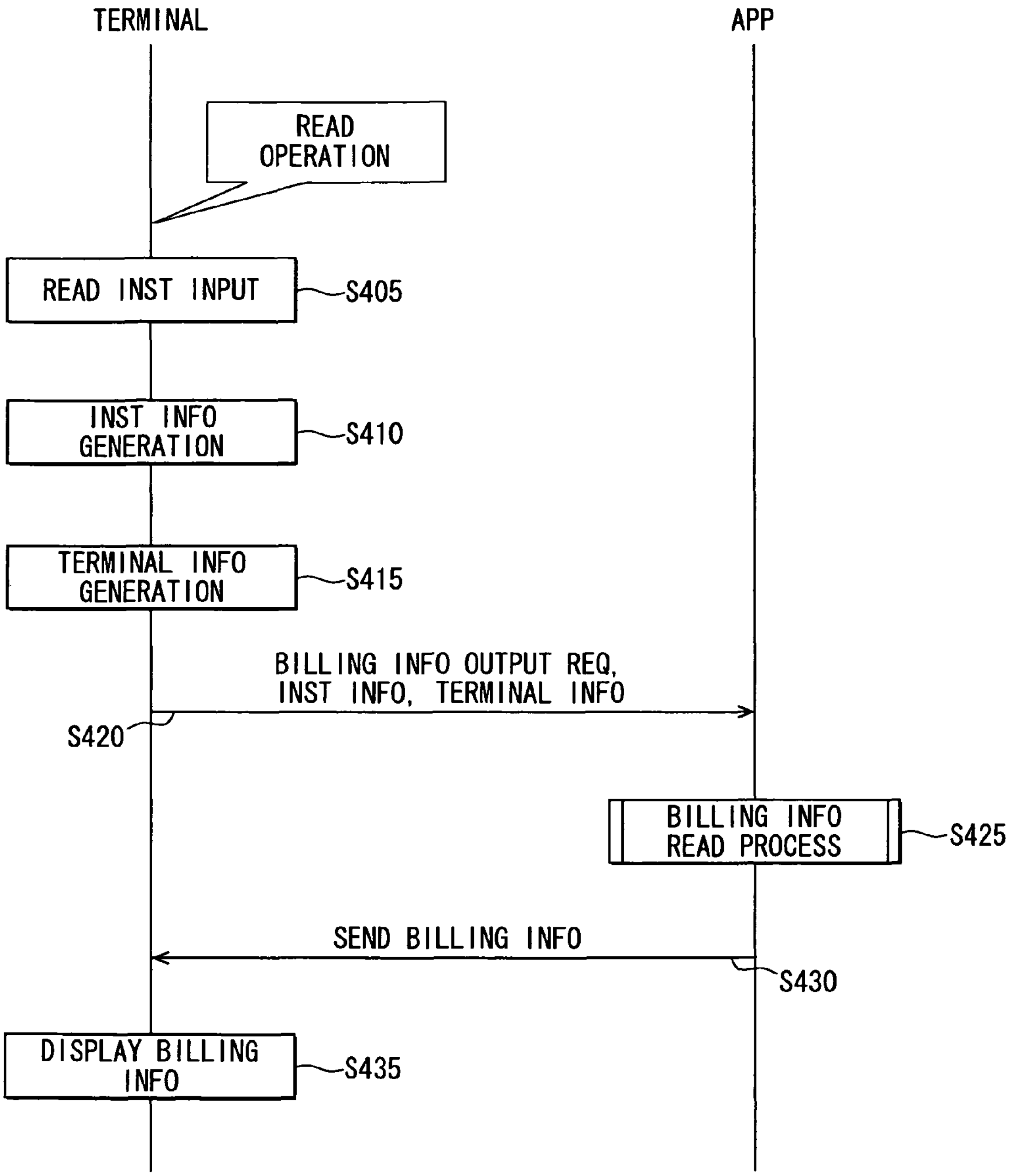
FIG. 10 is a sequence chart of processing that is performed for reading settlement record information.

The sequence chart shown in FIG. 9 is used to describe the processing that sets the vehicle-use card ID registered in the vehicle unit 10 to the activated condition that allows the use of the ID by using either of the first portable terminal 20 or the second portable terminal 30. In the following description, the processing regarding the activation of the vehicle-use card ID by using the first portable terminal is explained. However, the same operation scheme can be used for the activation by using the second portable terminal 30.

The control unit 25 of the first portable terminal 20 displays the vehicle-use card ID that can be set to the activated condition by the HMI 23 (i.e., a liquid crystal display in practice), when a user operation to set, to the activated condition, the vehicle-use card ID registered to the vehicle unit 10 is input through the HMI 23 (i.e., an operation button, specifically). Then, the control unit 25 transmits, through the non-contact communication I/F 24, an activation instruction together with the portable terminal ID, the vehicle-use card ID and the code respectively stored in the storage unit 26 to the vehicle unit 10 (S310), when a user selection of the vehicle-use card ID is input through the HMI 23 (i.e., an operation button, specifically) (S305).

In the vehicle unit 10 (designated as APP) that has received the activation instruction, the portable terminal ID, the vehicle-use card ID and the personal code, the control unit 15 determines the validity of the first portable terminal 20 that has transmitted the activation instruction (S315: designated as AUTH[ENTICATION] in FIG. 9). More practically, the control unit 15 identifies a matching record in the vehicle-use card ID table memorized in the storage unit 17. That is, the item "Card ID" and the item "Portable terminal used for registration" in the record are examined to identify the matching record that those items agreeing with the information in the received card ID and the terminal ID. Then, the validity of the identified record is determined by determining whether the item "Personal code" in this record and the received code agree with each other. In addition, when the transmission origin of the activation instruction is the second portable terminal 30, the validity of the second portable terminal 30 is determined as follows. That is, the control unit 15 identifies, from the activation terminal table in the storage unit 17, the matching record that has the item "Activation terminal" and the item "Vehicle-use card ID that can be activated (Activatable card ID)" agreeing with the received portable terminal ID and the vehicle-use card ID. Then, the agreement of the personal code in the identified record and the received code is examined.

Then, the control unit 15 of the vehicle unit 10 sets the received vehicle-use card ID to the activated condition (S320). Further, the control unit 15 transmits the completion of activation to the first portable terminal 20 through the non-contact communication I/F 14 (S325).

The control unit 25 of the first portable terminal 20 that has received the completion of activation transmits, to the vehicle unit 10 through the non-contact communication I/F 24, a settlement record information output instruction for outputting settlement record stored in the vehicle unit 10 (S330: settlement record information is designated as BILLING INFO hereinafter).

When the settlement record information output instruction is received, the control unit 15 of the vehicle unit 10 reads, from the settlement record information table, the settlement record information generated in the toll fee settlement processing that is performed in the activated condition that is set by using the portable terminal that has transmitted the activation instruction (S335). More practically, the control unit 15 identifies a record that indicates the portable terminal ID being received by the "Activation terminal" from among the records in the settlement record information table. Then, the control unit 15 stores a part of the record, that is, the item "Vehicle-use card ID," "Money amount," "Product information," "Place," and "Billing date," which serves as the settlement record information, in the identified record in a RAM temporarily. In this case, if there are more than ten matching records in the table, the control unit 15 stores, in the RAM, the settlement record information found in the ten latest records.

The control unit 15 of the vehicle unit 10 than transmits the settlement record information temporarily memorized in the RAM to the navigation apparatus 60 through the in-vehicle LAN communication unit 18 (S340). The navigation apparatus 60 that has received the settlement record information notifies the user of the settlement record information by displaying the received settlement record information on the display (not shown in the drawing) (S345). In this case, the navigation apparatus 60 may use a speaker (not shown in the drawing) instead for notifying the user of the information by voice.

(7) Settlement Record Information Read Processing

The processing for reading the settlement record information that is memorized in the vehicle unit 10 by using the first portable terminal 20 and the second portable terminal 30 is described in the following. The first portable terminal 20 can read the settlement record information generated in the toll fee settlement processing performed with the vehicle-use card ID registered by using this first portable terminal 20. In addition, the second portable terminal 30 can read the settlement record information generated in the toll fee settlement processing performed with the vehicle-use card ID that has been set to the activated condition by using this second portable terminal 30. Moreover, though, in the following description, the processing for reading the settlement record information by using the first portable terminal 20 is explained, the same processing scheme can be used even when the second portable terminal 30 is used.

The control unit 25 of the first portable terminal 20 receives, from the user through the HMI 23 (i.e., an operation button, specifically), an instruction for reading the settlement record information stored in the vehicle unit 10, the control unit 25 further receives, from the user, an instruction that specifies the settlement record information to be read (S405). More practically, the control unit 25 of the first portable terminal 20 receives, through the HMI 23 (i.e., an operation button, specifically), the following instructions.

(1-a)

An instruction that specifies the settlement record information generated in the toll fee settlement processing performed with the vehicle-use card ID specified by the user from among all of the vehicle-use card IDs registered by using the first portable terminal 20. In this case, though the registered vehicle-use card IDs are stored in the storage unit 26 of the first portable terminal 20, a selection input for selecting the vehicle-use card ID may be allowed for specifying the vehicle-use card ID.

(1-b)

An instruction that specifies the settlement record information generated in the toll fee settlement processing executed at a time specified by the user from among all of the toll fee settlement processing performed with the vehicle-use card ID registered by using the first portable terminal 20.

(1-c)

An instruction that specifies the settlement record information generated in the toll fee settlement processing performed with the vehicle-use card ID that has been set to the activated condition by the terminal specified by the user from among all of the toll fee settlement processing performed with the vehicle-use card ID registered by using the first portable terminal 20. In this case, though the portable terminal IDs of the second portable terminal 30, which are registered as the activation terminals, are stored in the storage unit 26 of the first portable terminal 20, a selection input for selecting the portable terminal ID may be allowed for specifying the activation terminal.

(1-d)

An instruction that specifies the settlement record information generated in the toll fee settlement processing that has settled the money amount fulfilling a user specified money amount condition (i.e., paying the amount of money specified by the user) from among all the toll fee settlement processing performed with the vehicle-use card ID registered by using the first portable terminal 20.

(1-e)

An instruction that specifies the settlement record information generated in the toll fee settlement processing that has been performed in the place fulfilling a user specified place condition from among all the toll fee settlement processing performed with the vehicle-use card ID registered by using the first portable terminal 20.

(1-f)

An instruction that specifies the settlement record information generated in the toll fee settlement processing that has a discount applied thereto from among all the toll fee settlement processing during the travel of the tollway performed with the vehicle-use card ID registered by using the first portable terminal 20.

The control unit 35 of the second portable terminal 30 accepts the following instructions through the HMI 33 (i.e., an operation button, specifically) if it is the case that the settlement record information is read by using the second portable terminal 30.

(2-a)

An instruction that specifies settlement record information generated in the toll fee settlement processing performed with the vehicle-use card ID specified by the user from among all the toll fee settlement processing performed with the vehicle-use card ID that has been set to the activated condition by using the second portable terminal 30. In this case, though the vehicle-use card IDs that can be activated (i.e., Activatable card ID) are stored in the storage unit 36 of the second portable terminal 30, a selection input for selecting the vehicle-use card ID may be allowed for specifying the vehicle-use card ID.

(2-b)

An instruction that specifies the settlement record information generated in the toll fee settlement processing executed at the time specified by the user from among all the toll fee settlement processing performed with the vehicle-use card ID that has been set to the activated condition by using the second portable terminal 30.

(2-c)

An instruction that specifies the settlement record information generated in the toll fee settlement processing that has settled the money amount fulfilling a user specified money amount condition (i.e., paying the amount of money specified by the user) from among all the toll fee settlement processing performed with the vehicle-use card ID that has been set to the activated condition by using the second portable terminal 30.

(2-d)

An instruction that specifies settlement record information generated in the toll fee settlement processing that has been performed in the place fulfilling a user specified place condition from among all the toll fee settlement processing performed with the vehicle-use card ID that has been set to the activated condition by using the second portable terminal 30.

(2-e)

An instruction that specifies settlement record information generated in the toll fee settlement processing that has a discount applied thereto from among all the toll fee settlement processing at the time of tollway travel performed with the vehicle-use card ID that has been set to the activated condition by using the second portable terminal 30.

It may be possible to combine above instructions to generate another instruction. That is, for example, an instruction for specifying the settlement record information generated in the toll fee settlement processing performed at a specified time by using the specified vehicle-use card ID may be received.

The control unit 25 of the first portable terminal 20 then generates instruction specifying information that specifies the instruction that specifies the settlement record information received in S405 (S410). Then, the control unit 25 generates portable terminal information that includes type information showing a terminal that is used for reading the settlement record information (i.e., which one of the first portable terminal 20 or the second portable terminal 30 is used for reading information) together with the code A stored in the storage unit 26 and the portable terminal ID of the first portable terminal 20 (S415). In case that the second portable terminal 30 is used, the code A in the portable terminal information is replaced with the code B.

The control unit 25 of the first portable terminal 20 then transmits the settlement record information output instruction, the instruction specifying information, and the portable terminal information to the vehicle unit 10 through the non-contact communication I/F 24 (S420).

The control unit 15 of the vehicle unit 10 that has received the settlement record information output instruction, the instruction specifying information, and the portable terminal information performs the settlement record information read processing as a subroutine for reading, from the settlement record information table, the settlement record information that agrees with the contents of the instruction specifying information, by using both of the instruction specifying information and the portable terminal information as two arguments of the sub-routine (S425). If the settlement record information is successfully read in the settlement record information read processing, the control unit 15 transmits the retrieved settlement record information through the non-contact communication I/F 14 to the first portable terminal 20 (S430).

In the first portable terminal 20 that has received the settlement record information, the control unit 25 displays the received settlement record information on the HMI 23 (i.e., a liquid crystal display in practice) (S435). In this case, the first portable terminal 20 may inform the user of the received settlement record information by voice from a speaker (not shown in the drawing) that is disposed in the first portable terminal 20.

(8) Record Retrieval Processing

Figure 11:
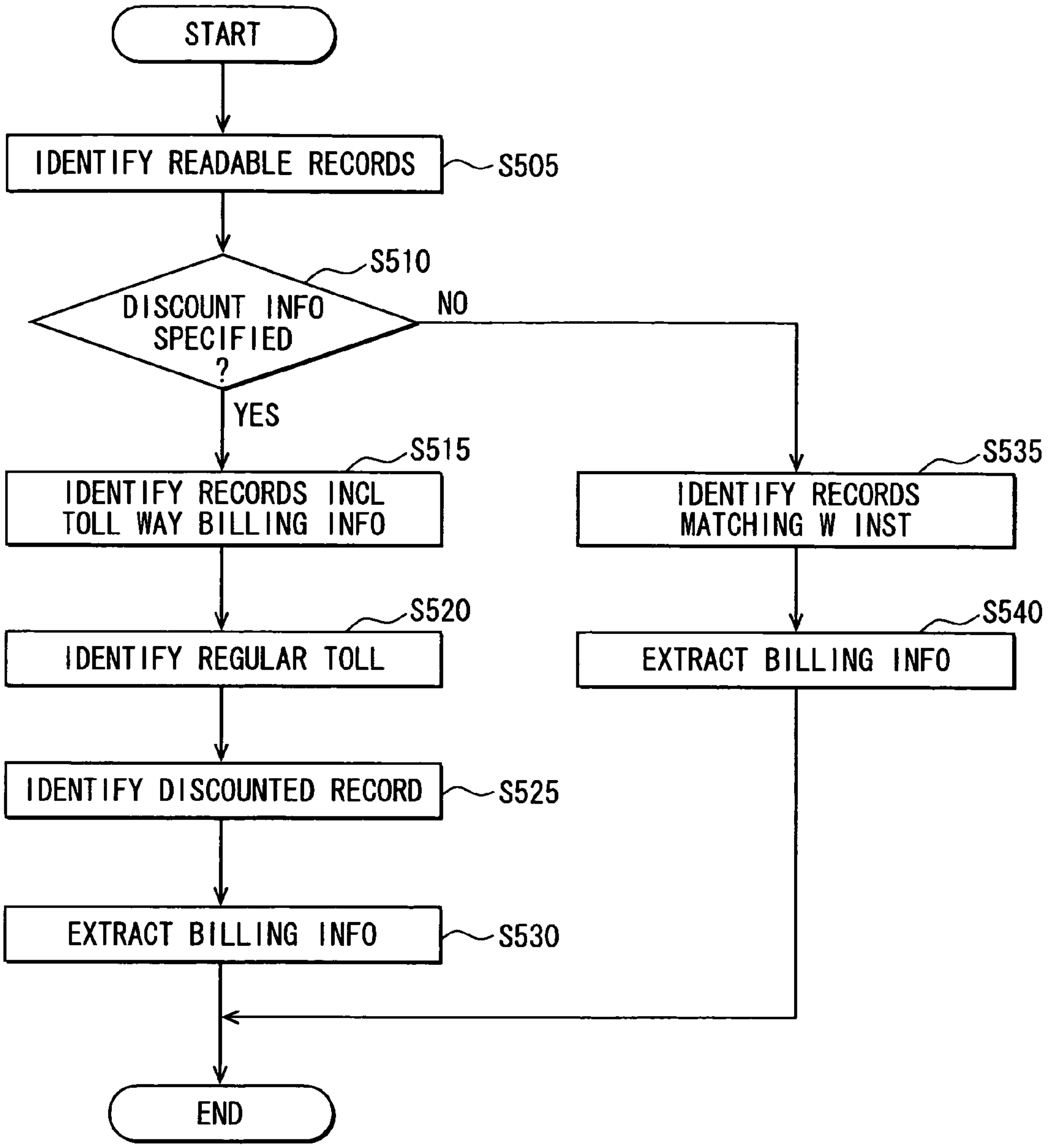
FIG. 11 is a flow chart of processing that is performed for extracting the settlement record information that is to be output from the portable terminal.

The processing (i.e., a sub-routine) for retrieving the settlement record information called in S425 is described in the following with reference to FIG. 11. The sub-routine "record retrieval processing" uses the instruction specifying information and the portable terminal information as the arguments. Further, the record retrieval processing reads, from the settlement record information table memorized in the storage unit 17 of the vehicle unit 10, the settlement record information that is specified by the instruction specifying information.

In S505, the control unit 15 of the vehicle unit 10 temporarily memorizes, in the RAM, the record that has the settlement record information that can be read by using the portable terminal that has transmitted the settlement record information output request (or, an instruction for outputting the same) from the settlement record information table memorized in the storage unit 17. More practically, when the type information in the portable terminal information that serves as the argument of the sub-routine shows the first portable terminal 20, the control unit 15 identifies, from among the records in the vehicle-use card ID information table stored in the storage unit 17, a record that has matching items of "Portable terminal used for registration" and "Personal code" contained in the portable terminal information, and then identifies the vehicle-use card ID in the above-identified record. Then, a record having a vehicle-use card ID that is matching with the above-identified card ID is identified from among the records in the settlement record information table memorized in the storage unit 17, and this record is memorized in the RAM temporarily. Moreover, when the type information included in the portable terminal information shows the second portable terminal 30, the control unit 15 identifies, from among the records in the activation terminal table stored in the storage unit 17, a record that has matching items of "Activation terminal" and "Personal code" with the terminal ID and the code in the portable terminal information, and then identifies the vehicle-use card ID contained in the item "Vehicle-use card ID that can be activated (Activatable card ID)" in the identified record. Then, from the settlement record information table stored in the storage unit 17, a record having a matching vehicle-use card ID identified above and a matching portable terminal ID found in the portable terminal information is identified, and then the identified record is memorized in the RAM temporarily. Then, the processing by the control unit 15 proceeds to S510.

In S510, the control unit 15 determines whether the contents of the instruction specifying information show an instruction for specifying the settlement record information generated in the toll fee settlement processing having the discount applied thereto from among all the toll fee settlement processing at the time of tollway travel, by referring to the instruction specifying information. That is, the control unit 15 determines whether the instruction corresponds to the one in (1-f) or (2-e). If the instruction is determined as the above-described one, the processing proceeds to S515. If the instruction is not the one, the processing proceeds to S535.

In S515, the control unit 15 identifies a record including the settlement record information generated in the toll fee settlement processing at the time of tollway travel, by referring to the item "Product information" in the record of the settlement record information table memorized in the RAM, and then carries the process on to S520.

In S520, the control unit 15 specifies a tollway and its traveled section shown in the item "Product information" of the record identified in S515. Then, the control unit 15 transmits the tollway and its traveled section to the navigation apparatus 60 through the in-vehicle LAN communication unit 18, and, by using a toll fee calculation function of the navigation apparatus 60, identifies the regular toll fee (i.e., the toll fee without a discount) for the traveled section of the tollway for each of the records that has been identified in S515. Then, the control unit 15 carries the processing on to S525.

In S525, the control unit 15 compares the regular toll fees of these records identified in S525 with the "Money amount" of the record identified in S515, and identifies a record that has a lower money amount at the time of the tollway travel shown in the item "Money amount" than the regular toll fee. Then, the control unit 15 carries the processing on to S530.

In S530, the control unit 15 extracts a settlement record information portion (i.e., "Vehicle-use card ID," "Money amount," "Product information," "Place," and "Billing date," specifically) from the record identified in S525, and then newly stores the extracted information in the RAM. Then, the control unit 15 ends the present processing.

In S535 performed on a condition that the contents of the instruction specifying information shows other instruction that is different from the instruction for specifying the settlement record information generated in the toll fee settlement processing that has the discount applied thereto from among all the toll fee settlement processing at the time of tollway travel (i.e., an instruction corresponding to either of (1-a) to (1-e or (2-a) to (2-d) in S405), the control unit 15 specifies a record that agrees with the specifying instruction shown in the instruction specifying information from among the records in the settlement record information table that has been memorized in the storage unit 17. Then, the control unit 15 carries the processing on to S540.

In S540, the control unit 15 extracts the settlement record information portion (i.e., "Vehicle-use card ID," "Money amount," "Product information," "Place," and "Billing date," specifically) from the record identified in S535, from the record specified with S535, and then newly stores the extracted information in the RAM. Then, the control unit 15 ends the present processing.

By devising the following restrictions, privacy of the settlement record information stored in the vehicle unit 10 is protected from un-authorized use, and the usability of the in-vehicle system 1 is improved.

The contents of the restrictions are that only the settlement record information generated in the toll fee settlement processing performed with the vehicle-use card ID registered by using the first portable terminal 20 can be read when the first portable terminal 20 is used. Therefore, the owner of the first portable terminal 20 can refer only to the settlement record information generated in the toll fee settlement processing performed by the owner of the activation terminal concerning the vehicle-use card ID. As a result, the privacy of the other user is protected.

Moreover, the user who registered the vehicle-use card ID can confirm the use condition of the vehicle-use card ID by the owner of the activation terminal concerning the vehicle-use card ID, thereby improving the usability of the in-vehicle system 1.

Further, because the situation that the settlement record information not related to the owner of the first portable terminal 20 is read is prevented, the usability of the invention is improved.

Furthermore, the similar reasoning can be applied for the use of the second portable terminal 30. That is, the user of the second portable terminal 30 can only read the settlement record information generated in the toll fee settlement processing performed with the vehicle-use card ID activated by using the second portable terminal 30 (i.e., when the settlement record information is read by using the second portable terminal 30, only the above-identified information can be read). Therefore, the above advantageous effects of privacy protection are provided as well as improving the usability of the in-vehicle system 1.

Furthermore, the vehicle unit 10 transmits only the settlement record information specified by using the first portable terminal 20 or the second portable terminal 30 (S430) by reading the record from the settlement record information table (S425). Therefore, only the settlement record information that is required can be read, thereby improving the usability of the in-vehicle system 1.

More practically, when the settlement record information is read by using the first portable terminal 20, the user can read only the settlement record information generated in the toll fee settlement processing with the specified vehicle-use card ID registered by using the first portable terminal 20, from among the other card IDs.

Moreover, similarly as described above, the user can read only the settlement record information generated in the toll fee settlement processing executed at the specified time, from among all the toll fee settlement processing performed with the vehicle-use card ID registered by using the first portable terminal 20.

Moreover, similarly as described above, the user can read only the settlement record information generated in the toll fee settlement processing performed with the vehicle-use card ID that is activated by the specified activation terminal from among all the toll fee settlement processing performed with the vehicle-use card ID registered by using the first portable terminal 20.

Moreover, similarly as described above, the user can read only the settlement record information generated in the toll fee settlement processing that has performed payment of the specified money amount from among all the toll fee settlement processing performed with the vehicle-use card ID registered by using the first portable terminal 20.

Moreover, similarly as described above, the user can read only the settlement record information generated in the toll fee settlement processing taken place at the specified place from among all the toll fee settlement processing performed with the vehicle-use card ID registered by using the first portable terminal 20.

Therefore, the usability of the in-vehicle system 1 is improved.

Further, when the settlement record information is read by using the second portable terminal 30, the user can read only the settlement record information generated in the toll fee settlement processing with the specified vehicle-use card ID from among all the toll fee settlement processing performed with the vehicle-use card ID activated by using the second portable terminal 30.

Moreover, similarly as described above, the user can read only the settlement record information generated in the toll fee settlement processing executed at the specified time from among all the toll fee settlement processing performed with the vehicle-use card ID activated by using the second portable terminal 30.

Moreover, similarly as described above, the user can read only the settlement record information generated in the toll fee settlement processing that has performed payment of the specified money amount from among all the toll fee settlement processing performed with the vehicle-use card ID activated by using the second portable terminal 30.

Moreover, similarly as described above, the user can read only the settlement record information generated in the toll fee settlement processing taken place at the specified place from among all the toll fee settlement processing performed with the vehicle-use card ID activated by using the second portable terminal 30.

Therefore, the usability of the in-vehicle system 1 is improved.

Further, the user can read only the settlement record information generated in the toll fee settlement processing to which the discount is applied from among all the toll fee settlement processing for the tollway travel with the vehicle-use card ID registered by using the first portable terminal 20 when the settlement record information is read by using the first portable terminal 20.

Similarly, the user can read only the settlement record information generated in the toll fee settlement processing to which the discount is applied from among all the toll fee settlement processing for the tollway travel with the vehicle-use card ID activated by using the second portable terminal 30 even when the settlement record information is read by using the second portable terminal 30.

Therefore, the user can experience the improvement of the usability of the in-vehicle system 1 due to the ease of confirmation of toll fee discount regarding the time slot, the travel distance, the traveled section, and the like for the in-vehicle system 1 during the tollway travel.

Further, the in-vehicle system 1 reads ten pieces of settlement record information of the latest (recently-generated) settlement record information from among all the settlement record information generated in the toll fee settlement processing performed by using the portable terminal that has transmitted the activation instruction when the vehicle-use card ID is activated by using the portable terminal (S335).

Then, the settlement record information read in the above-described manner is transmitted to the navigation apparatus 60 (S340), and the transmitted information is notified to the user from the display unit of the navigation apparatus 60 or the like (S345).

Therefore, the usability of the in-vehicle system 1 is improved.

Further, the vehicle unit 10 transmits the settlement record information specified by the user to the portable terminal, and notifies the user of the settlement record information when the settlement record information is read by using the portable terminal (S435).

Therefore, the usability of the in-vehicle system 1 is improved.

Other Embodiments

Although the present disclosure has been fully described in connection with preferred embodiment thereof with reference to the accompanying drawings, it is to be noted that various changes and modifications will become apparent to those skilled in the art.

For example:

(1) The settlement record information may have additional items other than the items "Vehicle-use card ID," "Money amount," "Product information," "Place," and "Billing date" as described in the above embodiment. For instance, the item "Activation terminal" that is owned by the settlement record information table may be incorporated. Similar advantageous effects can be achieved even if the additional item is incorporated in the embodiment.

(2) From among all the settlement record information readable by the portable terminal, only the information generated in the processing regarding a purchase of a user-specified product is read and transmitted to the user. In this manner, the usability of the in-vehicle system 1 is improved.

(3) In the above embodiment, when the settlement record information is read by the portable terminal, the user specifies the settlement record information that is to be read by the portable terminal. However, the information may be read and transmitted without being explicitly specified by the user. That is, for example, the vehicle unit 10 may transmit the settlement record information in the settlement processing with the vehicle-use card ID that is firstly registered by using the first portable terminal 20. In this manner, the usability of the vehicle unit 10 is improved.

(4) The vehicle unit 10 identifies, in the above embodiment, the records including the settlement record information that is readable from the settlement record information table by using the portable terminal first, and, then, further identifies, from among the firstly identified records, records having the settlement record information specified by the user. However, the vehicle unit 10 may identify the records including the settlement record information specified by the user from the settlement record information table first, and, then, further identify the record including the settlement record information that is readable by using the portable terminal from among the records that has been identified first. In this manner, similar advantageous effects can be achieved.

(5) In the present embodiment, a shop or the like that has been authorized by a certain organization may have the first portable terminal disposed therein. The shop (e.g., an automobile part shop for providing an installation service for installing the vehicle unit 10 on the vehicle, a dealership that sells automobiles or the like) may have a personal computer that is connected to the wireless public telephone network 40, and this personal computer serves as the first portable terminal 20. This personal computer has an access to the card center server 50 through the wireless public telephone network.

Such changes, modifications, and summarized scheme are to be understood as being within the scope of the present disclosure as defined by appended claims.

(Correspondence with Claim Languages)

The correspondence of the terms used in the above embodiment to the terms used in claim recitation is shown.

The vehicle-use card ID corresponds to a card ID, the first portable terminal 20 and the second portable terminal 30 corresponds to an activation terminal, the settlement record information corresponds to card-related information, and the navigation apparatus 60 corresponds to the voice output unit and the display unit.

Further, the settlement record information output request corresponds to an output instruction, and the instruction specifying information corresponds to the information specification instruction. Further, the non-contact communication I/F 14 corresponds to a receiver, the control unit 15 corresponds to a control unit, the storage unit 17 corresponds to in a storage, the in-vehicle LAN communication unit 18 corresponds to a price identification unit, and the non-contact communication I/F 14 and the in-vehicle LAN communication unit 18 corresponds to an output unit.

Further, the processing of S335 corresponds to a determination process, and the processing of S340 corresponds to an output process. Further, the processing of S505 of the settlement record information read processing corresponds to a determination process, the processing of S430 corresponds to an output process, and the processing of S510 to S540 of the settlement record information read processing corresponds to an identification process.

Further, The "Vehicle-use card ID" of the settlement record information corresponds to identification information, the "Billing date" of the settlement record information corresponds to usage time information, the "Activation terminal" of the settlement record information table corresponds to activation terminal identification information, the "Money amount" of the settlement record information corresponds to payment amount information, and the "Place" of the settlement record information corresponds to place information, and the "Product information" of the settlement record information corresponds to product information.

What is claimed is:

1. A vehicle unit for use in a toll process that processes data for setting a toll by using a card ID in communication with a roadside unit, the vehicle unit comprising:

a receiver receiving an activation instruction that activates the card ID by setting the card ID to an activated condition;

a controller setting the card ID to the activated condition in correspondence to the activation instruction received by the receiver for specifying, a specific card ID after performing a setting of one of the activated condition and an inactivated condition that makes the card ID unavailable;

a storage storing information on toll settlement; and an output unit outputting various information, wherein, when the controller receives an output instruction for outputting predetermined information from information regarding a toll settlement process stored in the storage, the controller performs a determination process that determines whether an output of the predetermined information to an external destination is allowed or not, and the controller outputs, as an output process, the predetermined information to the external destination through the output unit if the determination process determines that the output of the predetermined information to the external destination is allowed.

2. The vehicle unit of claim 1, wherein the control unit outputs, as the output process, through the output unit, the predetermined information determined as allowed to be output by the determination process that has originally transmitted the output instruction that is received by the receiver.

3. The vehicle unit of claim 1, wherein the vehicle unit is connected to a voice output unit, and the control unit is, in the output process, the predetermined information determined as allowed to be output by the determination process to the voice output unit connected to the vehicle unit through the output unit.

4. The vehicle unit of claim 1, wherein the vehicle unit is connected to a display unit, and the control unit is, in the output process, the predetermined information determined as allowed to be output by the determination process to the display unit connected to the vehicle unit through the output unit.

5. The vehicle unit of claim 1, wherein the predetermined information is card-related information regarding the card ID.

6. The vehicle unit of claim 5, wherein the vehicle unit generates payment record information that records the toll process whenever the vehicle unit performs the toll process, the storage stores the payment record information, and the card-related information indicates the payment record information.

7. The vehicle unit of claim 6, wherein the control unit determines, in the determination process, that the output of the payment record information is allowed when the payment record information is generated in the toll process performed by using the card ID that has been set in the activated condition by an activation terminal.

8. The vehicle unit of claim 6, wherein the control unit determines, in the determination process, that the output of the payment record information is allowed when the payment record information is generated in the toll process performed by using the card ID that has been set in the activated condition.

9. The vehicle unit of claim 6, wherein the information specification instruction received by the receiver is an instruction that specifies the payment record information to be output in the output process to the external destination, the control unit identifies the payment record information identified by the information specification instruction received by the receiver, and the control unit outputs, to the external destination, through the output unit, in the output process, the payment record information that is determined as allowed to be output by the determination process and is identified by the identification process.

10. The vehicle unit of claim 9, the payment record information includes identification information that identifies the card ID that is used for the toll process regarding the present payment record information, the information specification instruction is an instruction that specifies the payment record information generated by the toll process performed by using the card ID specified by the user, and the control unit identifies, in the identification process, based on the identification information included in the payment record information that is stored in the storage, the payment record information specified by the information specification instruction.

11. The vehicle unit of claim 9, the payment record information includes usage time information that indicates a time of the toll process regarding the present payment record information, the information specification instruction is an instruction that specifies the payment record information generated by the toll process performed at a predetermined time, and the control unit specifies, in the specification process, based on the usage time information included in the payment record information that is stored in the storage, the payment record information specified by the information specification instruction.

12. The vehicle unit of claim 9, the information specification instruction is an instruction that specifies the payment record information generated by the toll process performed by using the card ID set as the activated condition under the activation instruction received by the receiver, the storage stores the payment record information in association with activation terminal identification information that identifies an activation terminal that has transmitted the activation instruction to set, in the activated condition, the card ID used for the toll process regarding the present payment record information, and the control unit identifies, in the identification process, based on the activation terminal identification information stored in the storage in association with the payment record information, the payment record information specified by the information specification, instruction.

13. The vehicle unit of claim 9, the payment record information includes payment amount information that indicates an amount of payment paid in the toll process regarding the present payment record information, the information specification instruction is an instruction that specifies the payment record information generated in the toll process that settles a payment amount that agrees with a condition of the payment amount, and the control unit identifies, in the identification process, based on the payment amount information included in the payment record information that is stored in the storage, the payment record information specified by the information specification instruction.

14. The vehicle unit of claim 9, the payment record information includes place information that indicates a place where the toll process regarding the present payment record information is performed, the information specification instruction is an instruction that specifies the payment record information generated in the toll process that is performed at the place that agrees with a condition of the place, the control unit identifies, in the identification process, based on the place information included in the payment record information that is stored in the storage, the payment record information specified by the information specification instruction.

15. The vehicle unit of claim 9 further comprising a price identification unit for identifying a price of a product, wherein the payment record information includes payment amount information that indicates an amount of payment paid in the toll process regarding the present payment record information as well as product information that indicates the product purchased in the present toll process, the information specification instruction is an instruction that species the payment record information generated in the toll process that has received a discount, the control unit identifies, in the identification process, by using the price identification unit, the price of the product indicated by the product information included in the payment record information that is stored in the storage, and the control unit determines, based on the price of the product identified by the price identification unit and the payment amount information included in the payment record information, whether or not the discount has been received in the toll process regarding the payment record information, and identifies the payment record information generated in the toll process that has received the discount.

16. The vehicle unit of claim 15, wherein the vehicle unit is configured to perform the toll process that settles a toll fee of a tollway, the price of the product identified by the price identification unit is a toll fee for a traveled section of the tollway, the product information included in the payment record information generated in the toll process for setting the toll fee of the tollway indicates the traveled section of the tollway together with a tollway that has been traveled by a subject vehicle, the information specification instruction is an instruction that specifies the payment record information generated in the toll process at a time of a tollway travel that has received the discount, the control unit identifies, in the identification process, by using the price identification unit, the toll fee of the traveled section of the tollway together with the tollway itself respectively indicated by the product information included in the payment record information that is stored in the storage, and the control unit determines, based on the toll fee identified by the price identification unit and the payment amount information included in the payment record information, whether or not the discount has been received in the toll process regarding the payment record information, and identifies the payment record information generated in the toll process that has received the discount.

17. The vehicle unit of claim 6, wherein the vehicle unit is configured to perform the toll process by using the card ID that has been registered, the control unit outputs, in the output process, through the output unit, the payment record information that has been determined as allowed to be output in the determination process and is generated in the toll process performed by using the card ID that has been registered first.

18. The vehicle unit of claim 1, wherein the receiver further receives an information specification instruction that specifies information to be output in the output process, the control unit performs an identification process that identifies the information specified in the information specification instruction, and the control unit outputs, in the output process, to the external destination, through the output unit, the information that is determined as allowed to be output by the determination process and is identified by the identification process.

19. A vehicle system comprising:

the vehicle unit recited in claim 1; and an activation terminal that transmits the activation instruction and the output instruction to the vehicle unit.

20. A program product stored in a computer-readable medium having computer-executable instructions, when executing causing a computer to perform steps of a method, the method comprising:

performing a determination process using the controller when the controller receives an output instruction for outputting predetermined information from information regarding a toll settlement process stored in a storage from an activation terminal through a receiver that determines whether an output of the predetermined information to an external destination by using the activation terminal that has originated the output instruction received by the receiver is allowed or not, and outputting, as an output process using the controller, the predetermined information to the external destination through the output unit if it is determined in the determination process that the output of the predetermined information to the external destination is allowed.

* * * * *